US006636954B2

United States Patent
Maeda

(10) Patent No.: US 6,636,954 B2
(45) Date of Patent: Oct. 21, 2003

(54) METHOD AND APPARATUS FOR INTER-DISK COPY PROCESSING, AND A COMPUTER PRODUCT

(75) Inventor: Naoaki Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 09/782,247

(22) Filed: Feb. 13, 2001

(65) Prior Publication Data

US 2001/0049776 A1 Dec. 6, 2001

(30) Foreign Application Priority Data

Jun. 2, 2000 (JP) .................................... 2000-166311

(51) Int. Cl.$^7$ ............................................. G06F 12/00
(52) U.S. Cl. .................. 711/162; 711/161; 711/154; 711/114; 711/100
(58) Field of Search .................. 711/114, 161, 711/162, 143, 111, 100

(56) References Cited

U.S. PATENT DOCUMENTS

| | | | | |
|---|---|---|---|---|
| 5,247,643 A | * | 9/1993 | Shottan | 711/143 |
| 6,044,444 A | * | 3/2000 | Ofek | 711/162 |
| 6,085,298 A | * | 7/2000 | Ohran | 711/162 |
| 6,366,986 B1 | * | 4/2002 | St. Pierre et al. | 711/162 |

FOREIGN PATENT DOCUMENTS

| | | | | |
|---|---|---|---|---|
| EP | 1058190 A2 | * | 6/2000 | G06F/11/14 |
| JP | HEI 11-279678 | | 9/1999 | |

* cited by examiner

Primary Examiner—Matthew Kim
Assistant Examiner—Zhuo H. Li
(74) Attorney, Agent, or Firm—Greer, Burns, & Crain, Ltd.

(57) ABSTRACT

A copy processing section aggregately copies differential data stored in a plurality of areas discretely existing on a copy source logical disk to a continuous area on a copy destination logical disk, and when a request to access to the copy source logical disk or copy destination logical disk is generated during the aggregation copying process, the aggregation copying process is stopped so that an accessing process is executed by an access processing section.

8 Claims, 13 Drawing Sheets

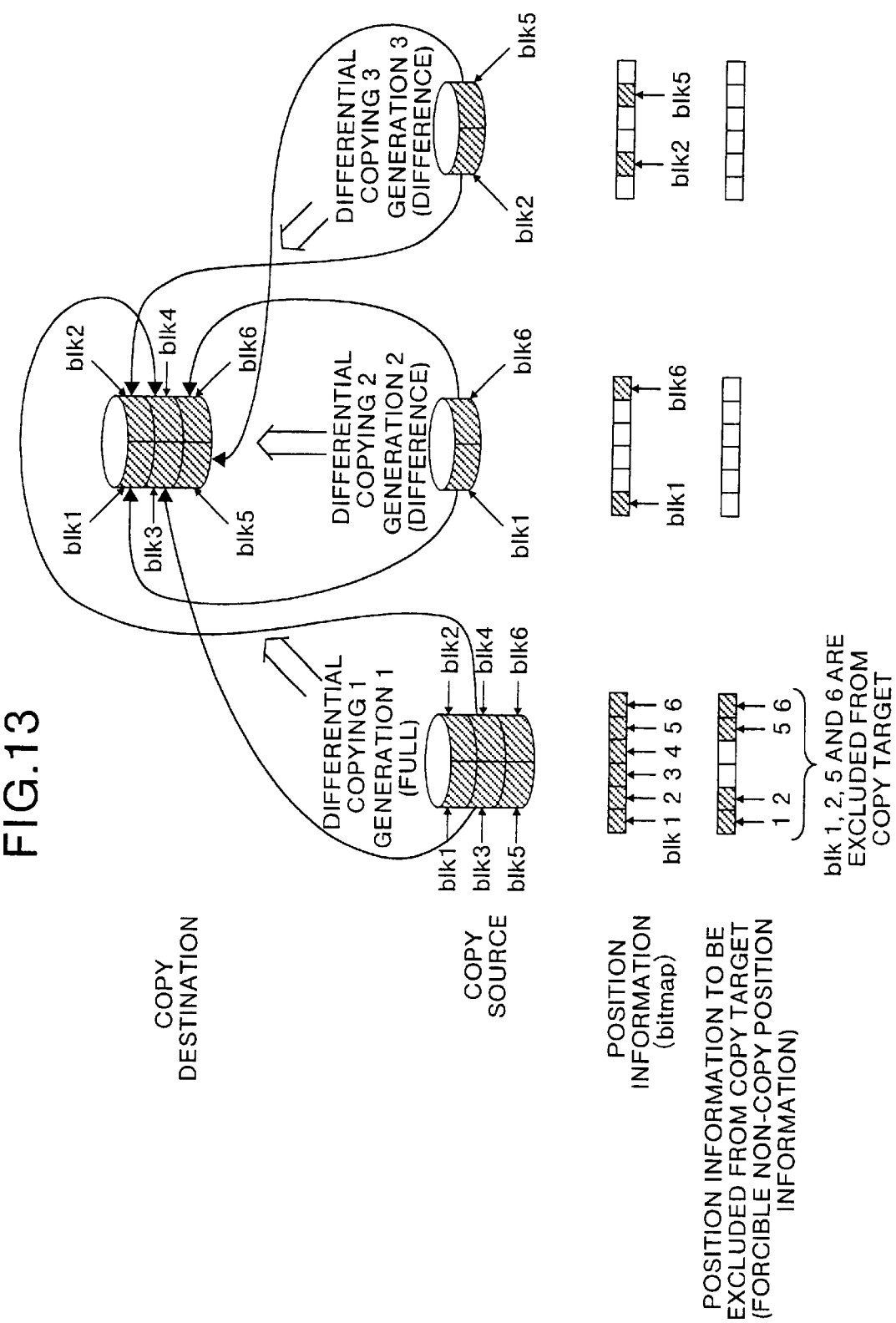

METHOD AND APPARATUS FOR INTER-DISK COPY PROCESSING, AND A COMPUTER PRODUCT

FIELD OF THE INVENTION

This invention relates to a technology of copying data stored in a plurality of areas on one logical disk to another logical disk. More particularly, this invention relates to a technology which allows a plurality of generations to be retained in a logical disk efficiently, and allows the data to be copied quickly into another medium.

BACKGROUND OF THE INVENTION

Conventionally, as a data copying technique in a logical disk such as a RAID apparatus, there exist
(1) a separate dual volume technique,
(2) a log structured file technique,
(3) a concurrent copy technique, and
(4) Japanese Patent Application No. 11-279678 applied on Sep. 30, 1999 by Fujitsu Ltd.

In case of the separate dual volume technique, when the RAID apparatus accepts a copy instruction from a host, a copy destination volume (logical disk) is prepared, and when the RAID apparatus accepts a duplication starting instruction from the host, copying from a copy source logical disk to a copy destination logical disk is started so that duplication is executed. Further, the RAID apparatus accepts a separate instruction from the host, it separates both the logical disks so that the copy source logical disk and the copy destination logical disk can be used from separate hosts.

In the log structured file technique, actual data are not copied but data in appearance are copied by pointer setting. For example, when data blocks of logical disks A, B and C are stored in one physical disk, the respective logical disks A, B and C are defined by a pointer of data in the physical disk and at the time of copying from the logical disk A to the logical disk B, a pointer of the logical disk A is set as a pointer of the logical disk B.

In the concurrent copy technique, when copying from a copy source logical disk to a copy destination logical disk is executed, a host reads data from the copy source disk and writes the data into the copy destination disk by a data transfer function. At this time, a bit map of a corresponding address of the copied data is set as "copied".

In Japanese Patent Application No. 11-279678, even during data copying, a copy destination logical disk can be accessed. More concretely, a response of copy completion is returned immediately according to a copy instruction, and an access is accepted while actual data are being copied, and copy source and copy destination logical disks are accessed to be referred to and be updated.

However, in case of the separate dual volume technique, a duplication creating instruction should be given before the copy instruction, and a dual state should be completed. Moreover, when a plurality of generations are retained, unchanged areas between the generations are copied in an overlapped state. For this reason, there arises a problem that space efficiency is low.

Furthermore, in case of the log structured file technique, the space efficiency is the highest at the time of retaining a plurality of generations. On the contrary, since areas which were not changed in the copy source and copy destination logical disks are used in common physically, when a disk damage occurs in the commonly used areas, the copy destination logical disk cannot be accessed. For this reason, there arises a problem that a data integrity level is low (safety is low).

Furthermore, in case of the concurrent copy technique, there arises a problem that a copy destination logical disk cannot be accessed during copying process. Moreover, when a plurality of generations are retained, areas which were not changed between the generations are retained in an overlapped state. For this reason, there arises a problem that the space efficiency is low.

The invention of Japanese Patent Application No. 11-279678 solves the problem of the separate dual volume technique that pre-process is required before the copy instruction and the problem of the concurrent copy technique that a copy destination logical disk cannot be accessed during the copying process. However, when a plurality of generations are retained, areas which were not changed between the generations are retained in an overlapped state, and thus there arises a problem that the space efficiency is low.

Particularly when data retained in a logical disk are copied and retained in another external medium in order to heighten safety, copy time is required in proportion to data amount. For this reason, if areas which were not changed between the generations are copied in the overlapped state, not only the space efficiency becomes low but also enormous copy time is required.

Accordingly, the extremely important problems are how to prevent the lowering of the space efficiency in the case of retaining a plurality of generations in a logical disk and how to shorten the enormous copy time required at the time of copying and retaining into another medium.

SUMMARY OF THE INVENTION

It is an object of the present invention to provide a method and apparatus which allow a plurality of generations to be retained in a logical disk efficiently, and also allows the data to be copied quickly into another medium. It is an another object of the present invention to provide a computer-readable recording medium which stores a computer program which, when executed on a computer, realizes the method according to the present invention.

The inter-logical disk copy processing apparatus according to one aspect of the present invention comprises an aggregation copying unit which aggregately copies differential data stored in a plurality of areas discretely existing on the copy source logical disk to a continuous area on the copy destination logical disk; and an access processing unit which, when a request to access to the copy source logical disk or copy destination logical disk is generated during the aggregation copying process by the aggregation copying unit, stopping the aggregation copying process by the aggregation copying unit and executing an accessing process.

According to the above-mentioned aspect of this invention, the differential data stored in the plurality of areas discretely existing on the copy source logical disk are aggregately copied to the continuous area on the copy destination logical disk, and when the request to access to the copy source logical disk or copy destination logical disk is generated during the aggregation copying process, the aggregation copy process is stopped and the accessing process is executed. For this reason, a plurality of generations can be retained efficiently in a logical disk, and data can be copied to be retained quickly to another external medium.

The aggregation copying unit may be constituted so as to select a plurality of areas on the copy source logical disk to be copy target based on update history information showing updating histories of the copy source logical disk and forcible copy position information showing that forcible copying is instructed from an external apparatus.

According to this structure, a plurality of areas on the copy source logical disk to be copy target are selected based on the update history information showing updating histories of the copy source logical disk and the forcible copy position information showing that forcible copying is instructed from an external apparatus. For this reason, the areas specified externally can be included in the copy targets.

Furthermore, the aggregation copying unit may be constituted so as to calculate logical OR of the update history information in which the area positions of the copy source logical disk have one to one correspondence to bit positions and forcible copy position information so as to create copy target information, and manages areas to be copied based on the created copy target information.

According to this structure, logical OR of the update history information in which the area positions of the copy source logical disk have one to one correspondence to bit positions and the forcible copy position information is calculated so that the copy target information is created, and areas to be copied are managed based on the created copy target information are managed. For this reason, areas to be copied can be managed efficiently.

The inter-disk copy processing apparatus may be constituted so as to further include a diffusion copying unit (corresponding to a copy processing section of FIG. 1) which diffusely copies the differential data, which were aggregately copied to the continuous area on the copy destination logical disk, to original positions of the copy source logical disk.

According to this structure, the differential data aggregately copied to the continuous area on the copy destination logical disk are diffusely copied to the original positions of the copy source logical disk. For this reason, the differential data which were saved on the copy destination logical disk can be restored efficiently in the copy source logical disk.

The diffusion copying unit may be constituted so as to determine copy areas to be copy targets based on position information of the copy source logical disk and forcible non-copy position information showing areas to be excluded from the copy targets instructed from an external apparatus.

According to this structure, copy areas to be copy targets are determined based on the position information of the copy source logical disk and the forcible non-copy position information showing areas to be excluded from the copy targets instructed from an external apparatus. For this reason, a part of the differential data to be restored can be excluded.

Furthermore, the access processing unit may be constituted so as to update an access target area of the copy destination logical disk when copy non-complete areas of the copy destination logical disk are accessed to be updated.

According to this structure, when copy non-complete areas of the copy destination logical disk are accessed to be updated, access target areas of the copy destination logical disk are updated. For this reason, even if the copying is not completed, the copy destination logical disk can be accessed.

Furthermore, the access processing unit may be constituted so as to forbid updating access to the copy destination logical disk during the aggregation copying process by the aggregation copying unit.

According to this structure, since the updating access to the copy destination logical disk is forbidden during the aggregation copying process, the aggregation copying process can be executed quickly.

Other objects and features of this invention will become apparent from the following description with reference to the accompanying drawings.

BRIEF DESCRIPTION OF THE DRAWINGS

FIG. 13 is an explanatory diagram for explaining the restoring operation when a generation 1 is a full backup and generations 2 and 3 are differentially backed up.

DESCRIPTION OF THE PREFERRED EMBODIMENTS

Preferred embodiment of the inter-logical disk copy processing apparatus, the copy processing method, and the computer product according to the present invention will be explained below with reference to the attached drawings. This embodiment explains a case in which the technology of this invention is applied to a computer system.

Figure 1:
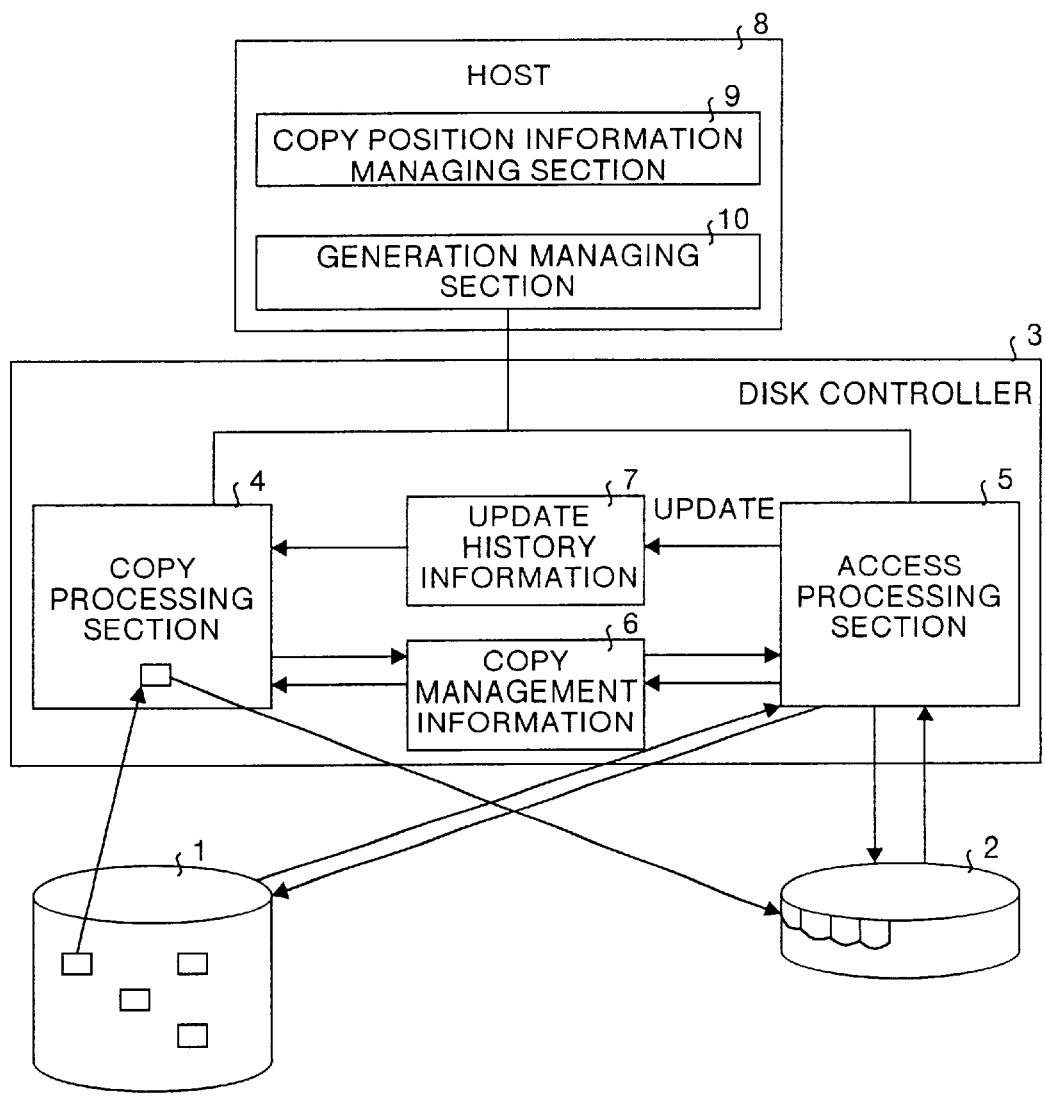
FIG. 1 is a functional block diagram showing a structure of a computer system according to an embodiment of the present invention.

FIG. 1 is a functional block diagram showing a structure of the computer system according to the present embodiment. As shown in FIG. 1, this computer system has logical disks 1 and 2, a disk controller 3 and a host 8.

The logical disks 1 and 2 are logical disk devices which are formed by one or a plurality of physical disks, and more concretely, as the physical disk a magnetic disk, an optical disk or the like is used.

The disk controller 3 is a controller for controlling the logical disks 1 and 2, and has a memory for storing various data and programs, and a processor for executing the programs. More concretely, the disk controller 3 is composed of a copy processing section 4 for executing a copying process, and an access processing section 5 for monitoring updating of the logical disks. The access processing section 5 updates copy management information 6 for managing a copying state, and the copy processing section 4 has update history information 7 composed of updating histories.

The host 8 has a processor and a main storage device, and is a calculator which uses the logical disks 1 and 2 as external devices. The host 8 has a copy position information managing section 9 for managing a relationship between information about copy position posted from the disk controller 3 and a copy destination logical disk, and a generation managing section 10 for managing a relationship between the copy source logical disk and the copy destination logical disk.

This computer system is constituted so that the copy processing section 4 aggregately copies differential data stored in the plurality of areas discretely existing on the copy source logical disk 1 to a continuous area on the copy destination logical disk 2, and the differential data aggregately copied to the logical disk 2 can be restored in the logical disk 1.

Figure 2:
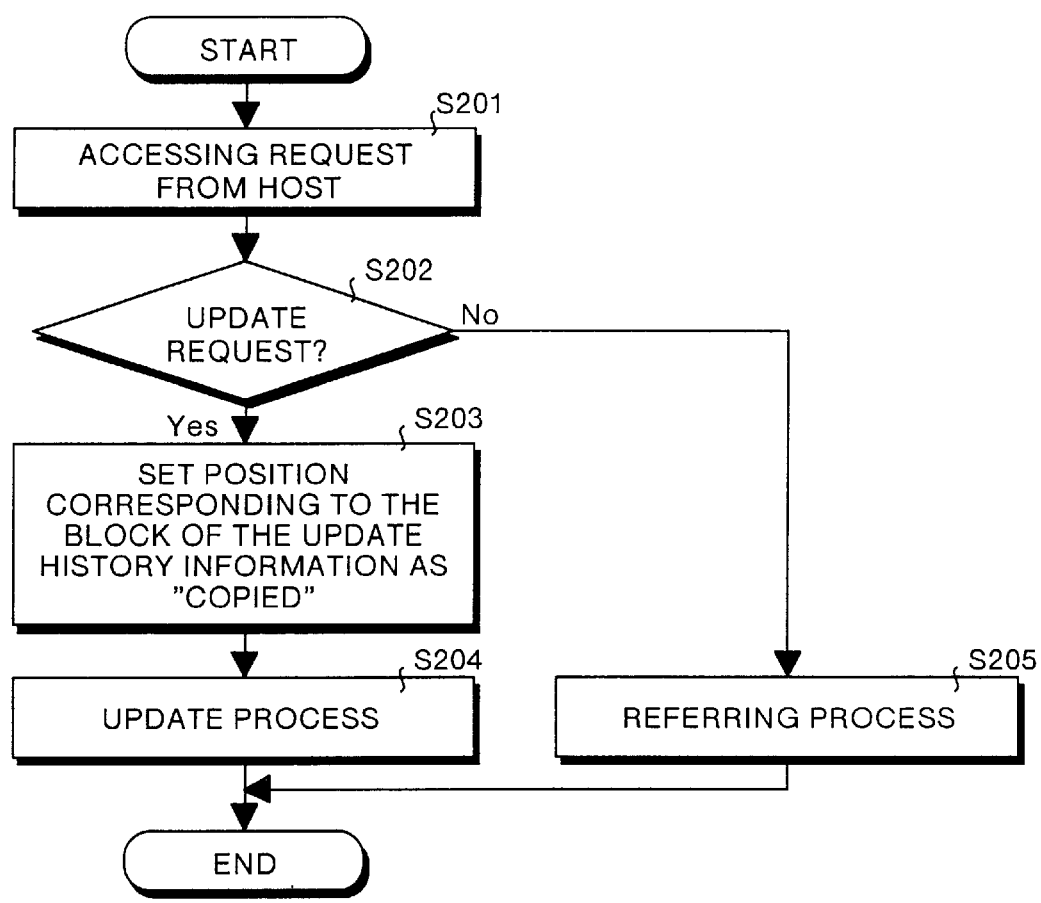
FIG. 2 is a flow chart showing a procedure of a logical disk updating/monitoring process by a disk controller shown in FIG. 1.

There will be explained below a procedure of an updating/monitoring process for the logical disks 1 and 2 by the disk controller 3 shown in FIG. 1. FIG. 2 is a flow chart showing the procedure of the updating/monitoring process for the logical disks 1 and 2 by the disk controller 3 shown in FIG. 1.

As shown in the drawing, when the access processing section 5 accepts a request to access to the logical disk 1 from the host 8 (step S201), the access processing section 5 checks as to whether or not the request is an updating request (step S202) When the request is not the updating request but a referring request (NO at step S202), the section 5 executes a referring process (step S205).

On the contrary, when the request is the updating request (YES at step S202), the access processing section 5 sets a position of the update history information 7 corresponding to the block as "updated" (step S203), and executes the update process (step S204). Here, the concrete procedures of the referring process and the update process will be mentioned later.

Figure 3:
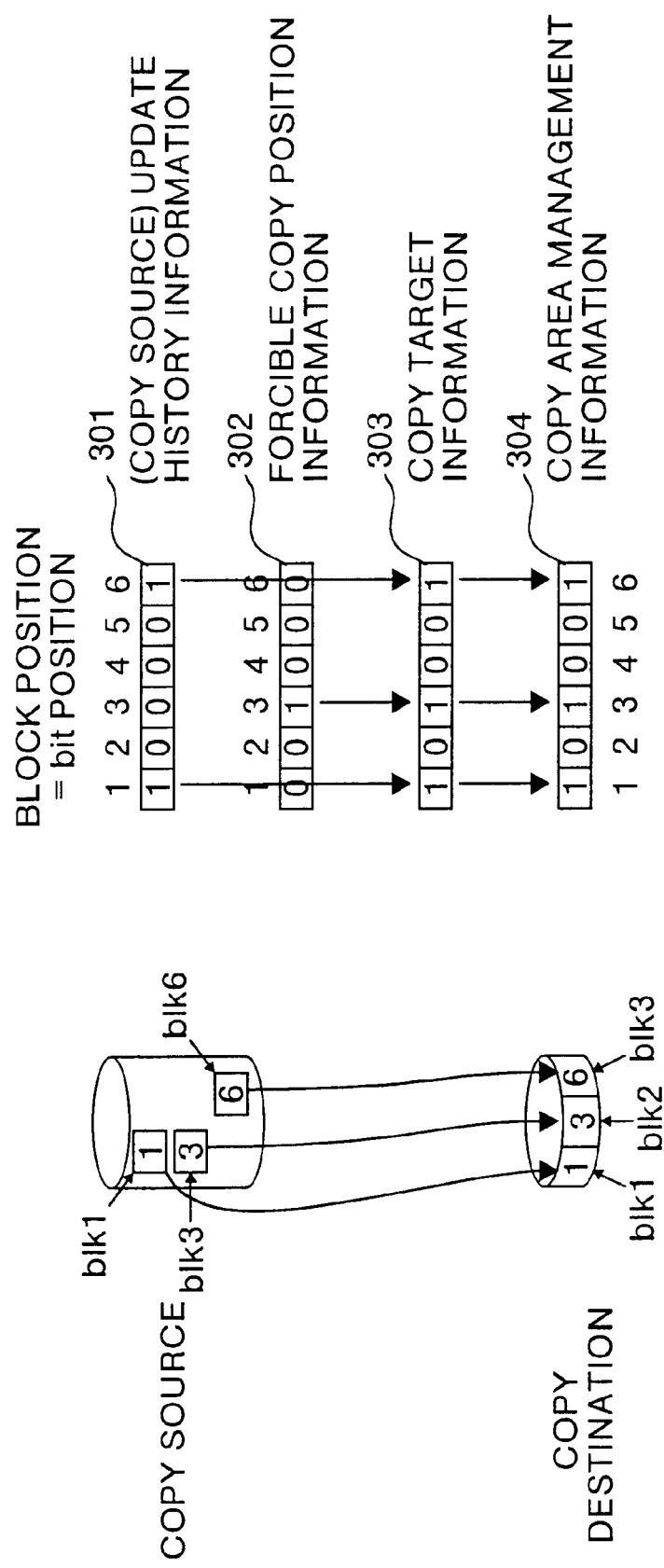
FIG. 3 is an explanatory diagram for explaining the concept of an aggregation copying process by the disk controller shown in FIG. 1.
Figure 4:
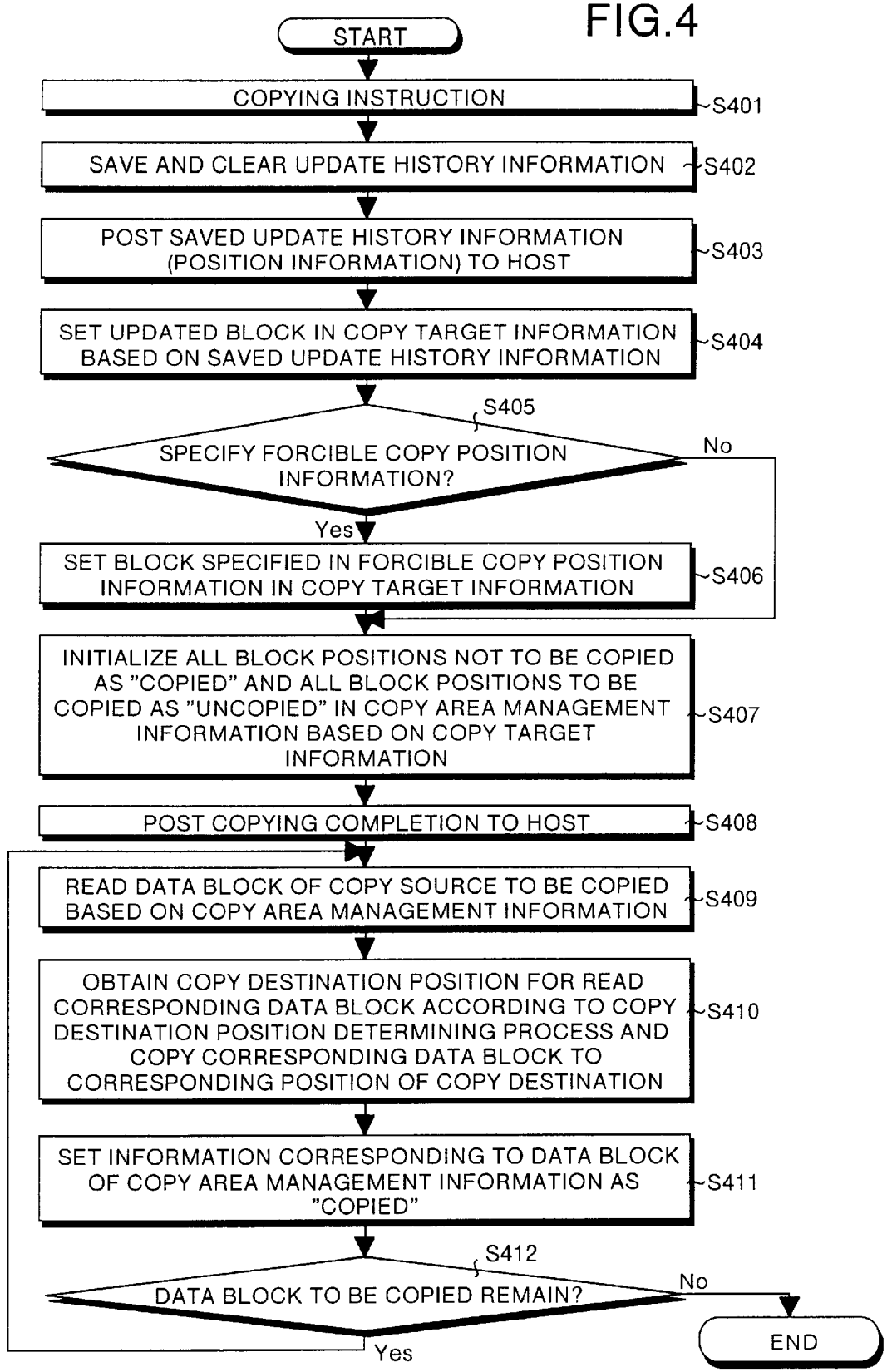
FIG. 4 is a flow chart showing the procedure of the aggregation copying process by the disk controller shown in FIG. 1.

There will be explained below an aggregation copying process by the disk controller 3 shown in FIG. 1. FIG. 3 is an explanatory diagram for explaining the concept of the aggregation copying process by the disk controller 3 shown in FIG. 1. FIG. 4 is a flow chart showing the procedure of the aggregation copying process by the disk controller 3 shown in FIG. 1. Here, in the following explanation, for convenience of the explanation, the logical disk 1 is a copy source disk, and the logical disk 2 is a copy destination disk.

As shown in FIG. 3, the aggregation copying process is a process for aggregately copying only block to be a copy target of blocks sprinkled on the copy source logical disk 1 to the copy destination logical disk 2.

For example, updated portions of the copy source logical disk 1 are blocks 1 and 6, and a portion which was instructed to be copied forcibly by the host 8 is block 3. As shown in FIG. 3, the blocks 1, 3 and 6 of the logical disk 1 are aggregately copied to the logical disk 2.

When the aggregation copying process is executed, as shown in FIG. 3, update history information 301, forcible copy position information 302, copy target information 303 and copy area management information 304 of the copy source which are stored in a bit map format are utilized.

These information is bit strings composed of "0" or "1" in which the respective bit positions correspond to block positions. More concretely, in the update history information 301, "0" shows non-updated, and "1" shows "updated". In the forcible copy position information 302, "0" shows that forcible copy is not required, and "1" shows that forcible copy is required.

In addition, in the copy target information 303, "0" shows "not copy target", and "1" shows "copy target". In the copy area management information 304, "0" shows "copied", and "1" shows "uncopied" (i.e. not yet copied).

For this reason, when the aggregation copy shown in FIG. 3 is executed, a logical OR of the update history information 301 and the forcible copy position information 302 is obtained so as to be the copy target information 303, and this is copied to the copy area management information 304. When copying of the block is completed, corresponding bits of the copy area management information 304 are replaced by "0" successively. For this reason, the respective bits of the copy area management information 304 become "0" finally.

The block position is defined that a logical disk is divided by a certain unit size and numbers are allocated to the divided parts starting from the head in ascending order. This block position can specify blocks on the logical disk all at once.

There will be explained below the procedure of the aggregation copying process by the disk controller 3 shown in FIG. 1. As shown in FIG. 4, when the disk controller 3 accepts notifications of the aggregation copying instruction and the forcible copy position information from the host 8 (step S401) the copy processing section 4 executes predetermined initializing processes (steps S402 to S407) and notifies the copying completion to the host 8 (step S408).

More concretely, the copy processing section 4 saves and clears the update history information 301 corresponding to the logical disk 1 (step S402), and posts the saved update history information 301 (position information) to the host 8 (step S403).

Thereafter, the copy processing section 4 sets the copy target information 303 corresponding to the updated block position of the saved updated history information 301 to "1" (copy is required) (step S404), and checks as to whether or not the forcible copy position information 302 is set (step S405). When the forcible copy position information 302 is set (YES at step S405), the copy target information 303 corresponding to the block position set as "copy being required" is set to "1" (copy is required) (step S406).

As a result, the information of the block which requires copying in the logical disk 1 is set in the copy target information 303. For example, in the case of FIG. 3, the blocks 1, 3 and 6 become copy targets.

Thereafter, after the copy processing section 4 refers to the copy target information 303 and sets the copy area management information 304 (step S407), it posts the copying completion to the host 8 (step S408). More concretely, all block positions which are not copied are set to "0" (copied) all the blocks to be copied are set to "1" (uncopied). In such a manner, initializing is executed. Actually, the copy target information 303 is copied to the copy area management information 304.

When such an initializing process is executed, the host 8 can access to the logical disks 1 and 2. At this stage, on the logical disk 2, an area which is set as "updated" in the update history information 301 and an area which is set as "copy being required" in the forcible copy position information 302 can be accessed from the head in a block number ascending order.

The host 8 can discriminate as to block numbers of the logical disk 1 where the respective blocks stored in the logical disk 2 are stored by the update history information 301 posted from the disk controller 3 and the forcible copy position information 302 specified by itself.

As returned to the explanation of FIG. 4, after completing the initializing processes (S402 to S408), the copy processing section 4 refers to the copy area management information 304 and reads a data block of the logical disk 1 corresponding to a block position which is set as "uncopied" (step S409).

Thereafter, a position of the copy destination is obtained for the read data block by a copy destination position determining process, mentioned later, and the data block is copied to the corresponding position of the copy destination (step S410).

The copy processing section 4 sets the information corresponding to the data block of the copy area management information 304 as "copied" (step S411), and checks as to whether or not a data block to be copied remains (step S412). When the data block to be copied remains (YES at step S412) the sequence goes to step S409 so that the above processes are repeated. All the data blocks to be copied are processed (NO at step S412), the process is ended.

When a request to access to the copy source logical disk 1 or the copy destination logical disk 2 is generated during the processes at steps S409 to S412, the copying process is stopped so that an accessing process, mentioned later, is executed.

Figure 5:
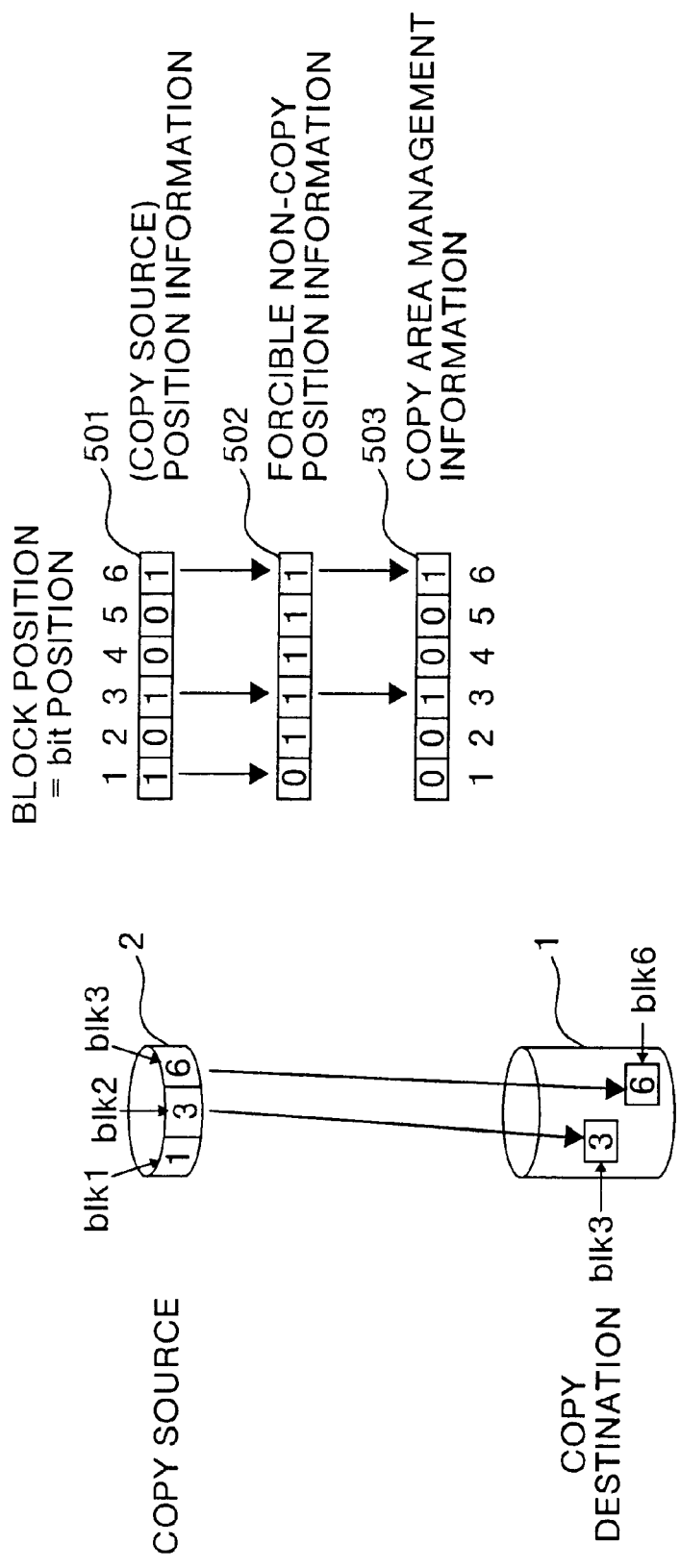
FIG. 5 is an explanatory diagram for explaining the concept of a diffusion copying process by the disk controller shown in FIG. 1.
Figure 6:
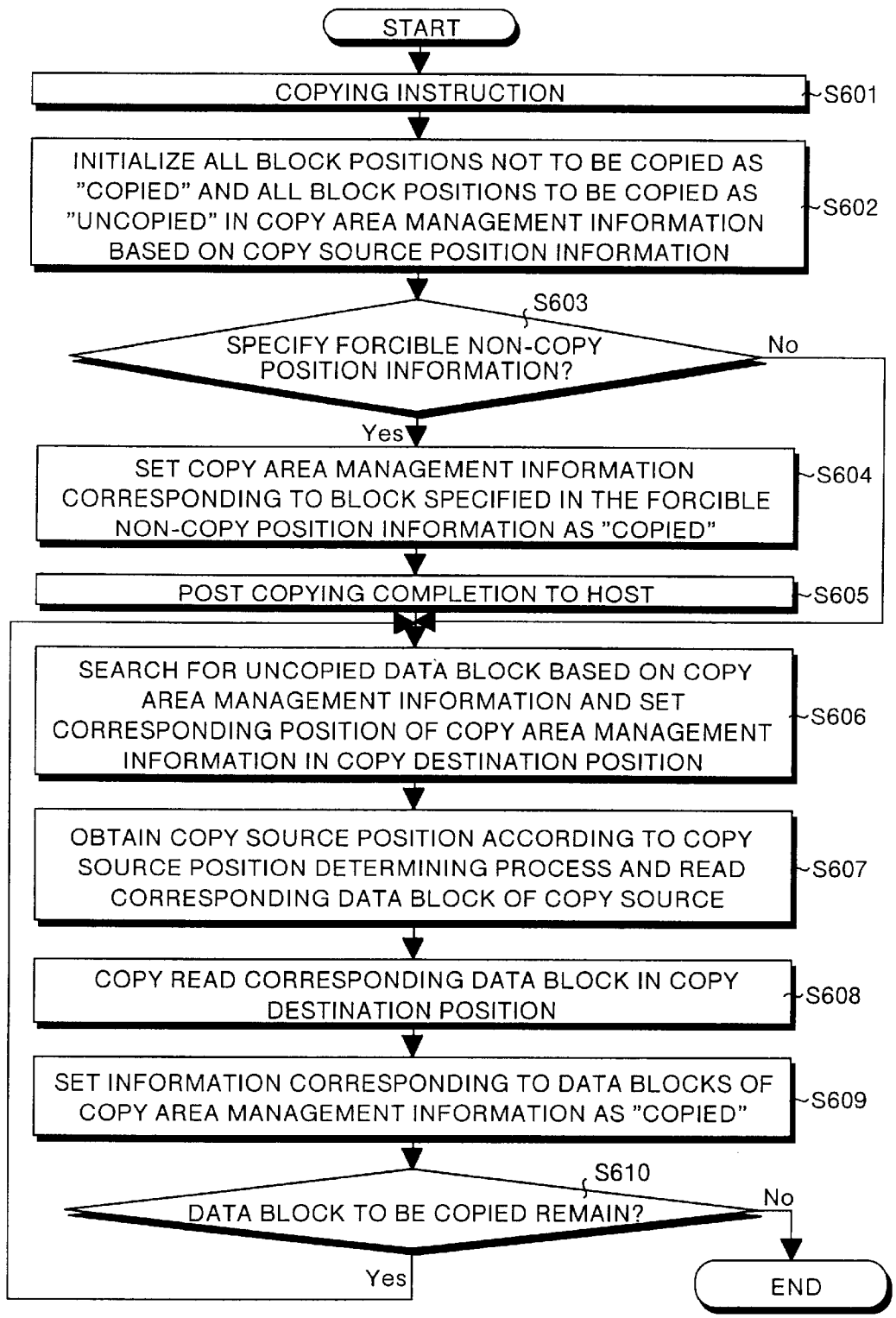
FIG. 6 is a flow chart showing a procedure of the diffusion copying process by the disk controller shown in FIG. 1.

There will be explained below a diffusion copying process by the disk controller 3 shown in FIG. 1. FIG. 5 is an explanatory diagram for explaining the concept of the diffusion copying process by the disk controller 3 shown in FIG. 1. FIG. 6 is a flow chart showing the procedure of the diffusion copying process by the disk controller 3 shown in FIG. 1. Here, in the following explanation, for convenience of the explanation, the logical disk 2 is a copy source disk, and the logical disk 1 is a copy destination disk.

As shown in FIG. 5, the diffusion copying process is a process for diffusing and copying the respective blocks stored in the logical disk 2 by the above-mentioned aggregation copying process onto the original logical disk 1.

More concretely, when the disk controller 3 receives a diffusion copying instruction and forcible non-copy position information 502 showing position information of an area forcibly excluded from copy targets from the host 8, it generates copy area management information 503 based on the position information 501 and the forcible non-copy position information 502.

The position information 501, the forcible non-copy position information 502 and the copy area management information 503 are stored in a bit map format. When the bit positions have one to one correspondence to the block positions, the above information has information of "0" or "1" as for the respective block positions.

The position information 501 shows original storing positions of the data blocks stored continuously in the copy source, and "0" means an invalid block and "1" means a valid block. In the example shown in FIG. 5, since the block positions 1, 3 and 6 are set as valid blocks, the data blocks in the block positions 1, 3 and 6 are stored continuously in the copy source logical disk 2.

Similarly to the position information 501, in the forcible non-copy position information 502, the bit positions have one to one correspondence to the block positions, and "0" means non-copy target, and "1" means copy target. Here, when "0" is set (invalid block) in the position information 501, even if "1" (copy target) is set in the forcible non-copy position information 502, data blocks are not copied.

Similarly to the position information 501 or the like, in the copy area management information 503, the bit positions have one to one correspondence to the original block positions, and "0" means "copied" and "1" means "uncopied".

Accordingly, when the diffusion copying process is executed, AND of the position information 501 and the forcible non-copy position information 502 is obtained, and its result is used as the copy area management information 503 so that corresponding data blocks are diffusely copied.

There will be explained below the procedure of the diffusion copying process by the disk controller 3 shown in FIG. 1. As shown in FIG. 6, when the disk controller 3 accepts a diffusion copying instruction from the host 8 (step S601), it refers to and sets the position information 501 of the specified copy source to the the copy area management information 503. More concretely, all block positions not to be copied are set to "0" (copied), and all block positions to be copied are initialized as "1" (uncopied) (step S602).

Thereafter, the disk controller 3 checks as to whether or not forcible non-copy position information 502 is specified (step S603). When it is specified (YES at step S603), the disk controller 3 sets the corresponding portion of the copy area management information 503 corresponding to the specified blocks in the forcible non-copy position information 502 to "0" (copied) (step S604), and posts copy completion to the host 8 (step S605). As a result, the host 8 can access to the logical disks 1 and 2.

Thereafter, the copy processing section 4 refers to the copy area management information 503 and searches for data blocks which are set to "uncopied" so as to set the corresponding position of the copy area management information in copy destination position (step S606).

The copy processing section 4 obtains the copy source position according to a copy source position determining process, mentioned later, and reads the corresponding data blocks of the logical disk 2 (step S607) so as to copy the data blocks to the copy destination positions of the logical disk 1 (step S608).

Thereafter, the copy processing section 4 sets information corresponding to the data blocks of the copy area management information 503 to "0" (copied) (step S609), and checks as to whether or not data blocks to be copied remain (step S610). When the data blocks remain (YES at step S610), the copy processing section 4 goes to step S606 so as to repeat a series of the above processes. When the corresponding data blocks do not exist (NO at step S610), the process is ended.

When the request to access to the copy source logical disk 2 or the copy destination logical disk 1 is made during the processes at steps S606 to S610, the copying process is stopped, and an accessing process, mentioned later, is executed.

Figure 7:
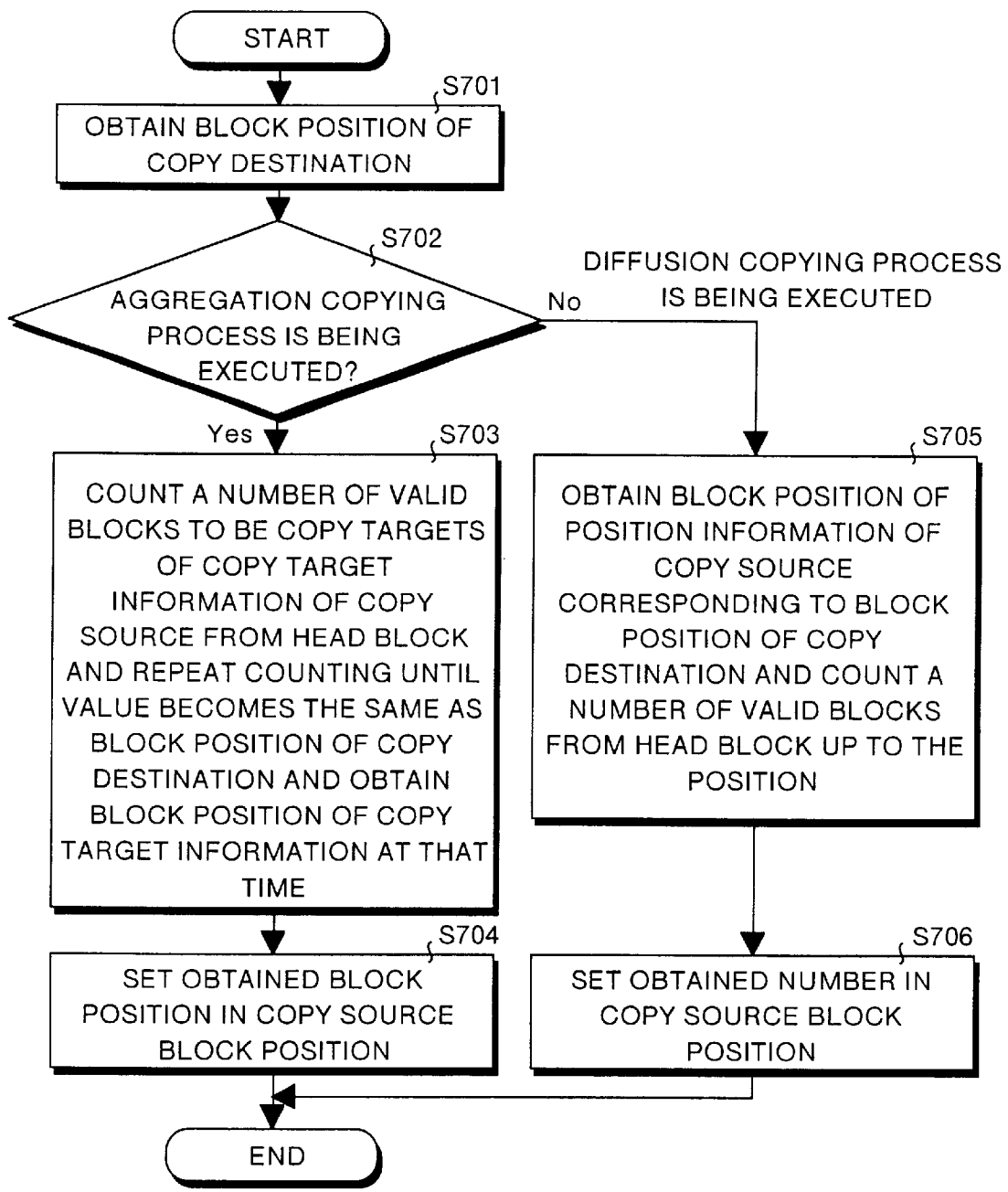
FIG. 7 is a flow chart showing a copy source position determining procedure.

There will be explained below the procedure of the copy source position determining process. FIG. 7 is a flow chart showing the copy source position determining procedure. As shown in the drawing, the copy processing section 4 obtains block position of a copy destination (step S701), and judges as to whether or not the aggregation copying process is being executed (step S702).

As a result, when the aggregation copying process is being executed (YES at step S702), the copy processing section 4 counts a number of valid blocks to be copied in order from the head block of the copy target information of the copy source and repeats the counting until the value becomes the same as the block position of the copy destination. The copy processing section 4 obtains a block position of the copy target information at that time (step S703), and sets the obtained block position in the block position of the copy source (step S704).

For example, when the block position of the copy destination is 3 in FIG. 3, when a number of blocks to be copied is counted from the head block of the copy target information 303, the third valid block position is 6. For this reason, a data block of the block position 6 of the copy source is stored in the block position 3 of the copy destination.

On the contrary, when not the aggregation copying process but the diffusion copying process is being executed (NO at step S702), the copy processing section 4 obtains a block position of the position information of the copy source corresponding to the block position of the copy destination and counts a number of valid blocks from the head block up to the position (step S705) so as to set the obtained number in the block position of the copy source (step S706).

For example, when the block position of the copy destination is 3 in FIG. 5, a number of valid blocks up to the position in the position information of the copy source corresponding to the block position of the copy destination is 2. For this reason, it is found that the data block stored in the block 2 of the copy source is originally stored in the block position 3.

Figure 8:
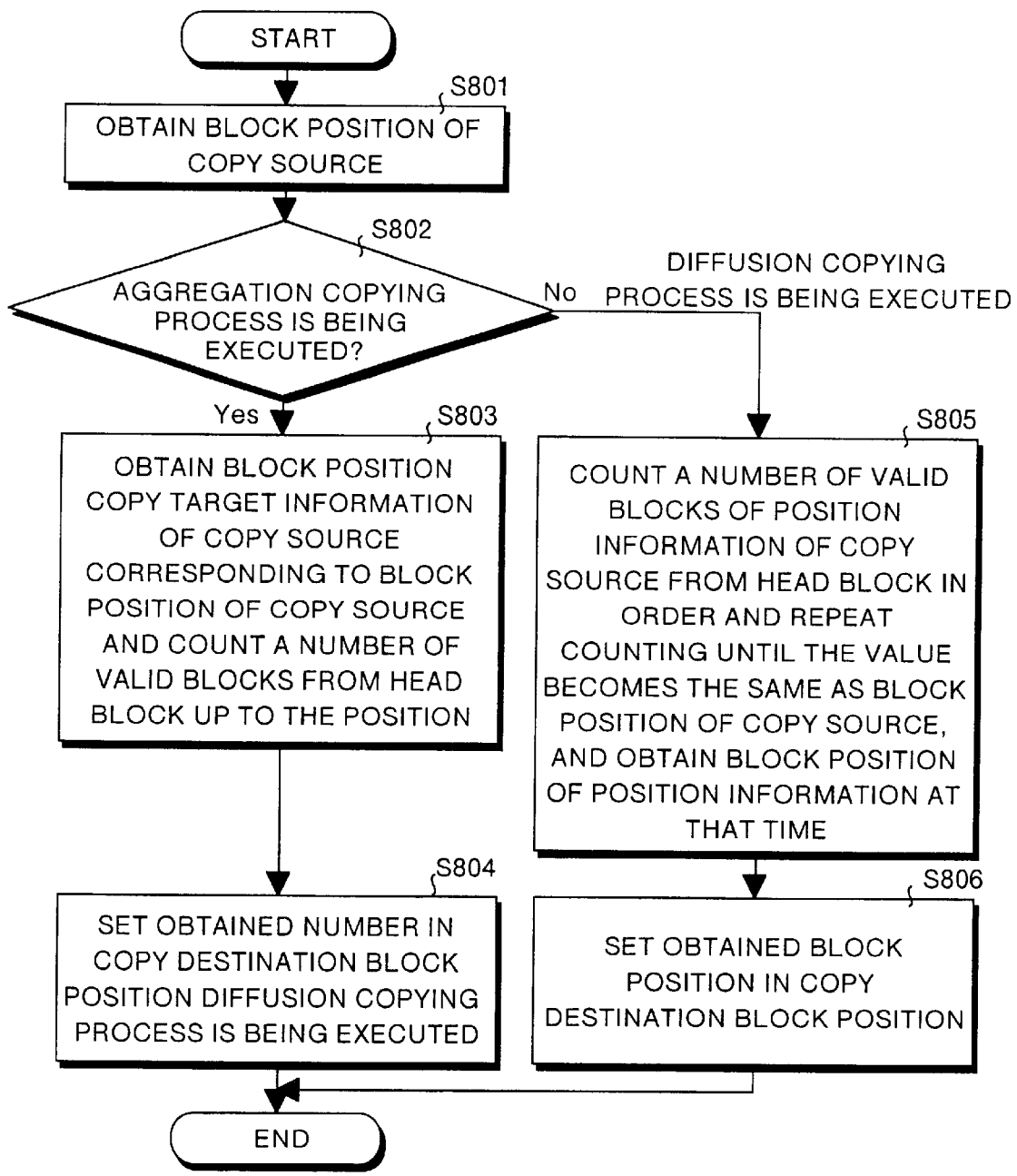
FIG. 8 is a flow chart showing a copy destination position determining procedure.

There will be explained below the copy destination position determining procedure. FIG. 8 is a flow chart showing the copy destination position determining procedure. As shown in the drawing, the copy processing section 4 obtains a block position of the copy source (step S801), and judges as to whether or not the aggregation copying process is being executed (step S802).

As a result, when the aggregation copying process is being executed (YES at step S802), the copy processing section 4 obtains a block position of copy target information of the copy source corresponding to the block position of the copy source, and counts a number of valid blocks from the head block to the position (step S803), and sets the obtained block number is set in the block position of the copy destination (step S804).

For example, when the block position of the copy source is 3 in FIG. 3, a number of valid blocks up to the position in the copy target information of the copy source corresponding to the block position of the copy source is 2. For this reason, it is found that the data block stored in the block 3 of the copy source should be stored in the block position 2 of the copy destination.

On the contrary, when not the aggregation copying process but the diffusion copying process is being executed (NO at step S802), the copy processing section 4 counts a number of valid blocks in order from the head block of the position information of the copy source and repeats the counting until the value becomes the same as the block position of the copy source. The copy processing section 4 obtains a block position of the position information at that time (step S805), and sets the obtained block position in the block position of the copy destination (step S806).

For example, when the block position of the copy source is 2 in FIG. 5, when a number of valid blocks is counted from the head block of the position information of the copy source, the second valid block position is 3. For this reason, it is found that the data block stored in the block position 2 of the copy source is originally stored in the block position 3.

Figure 9:
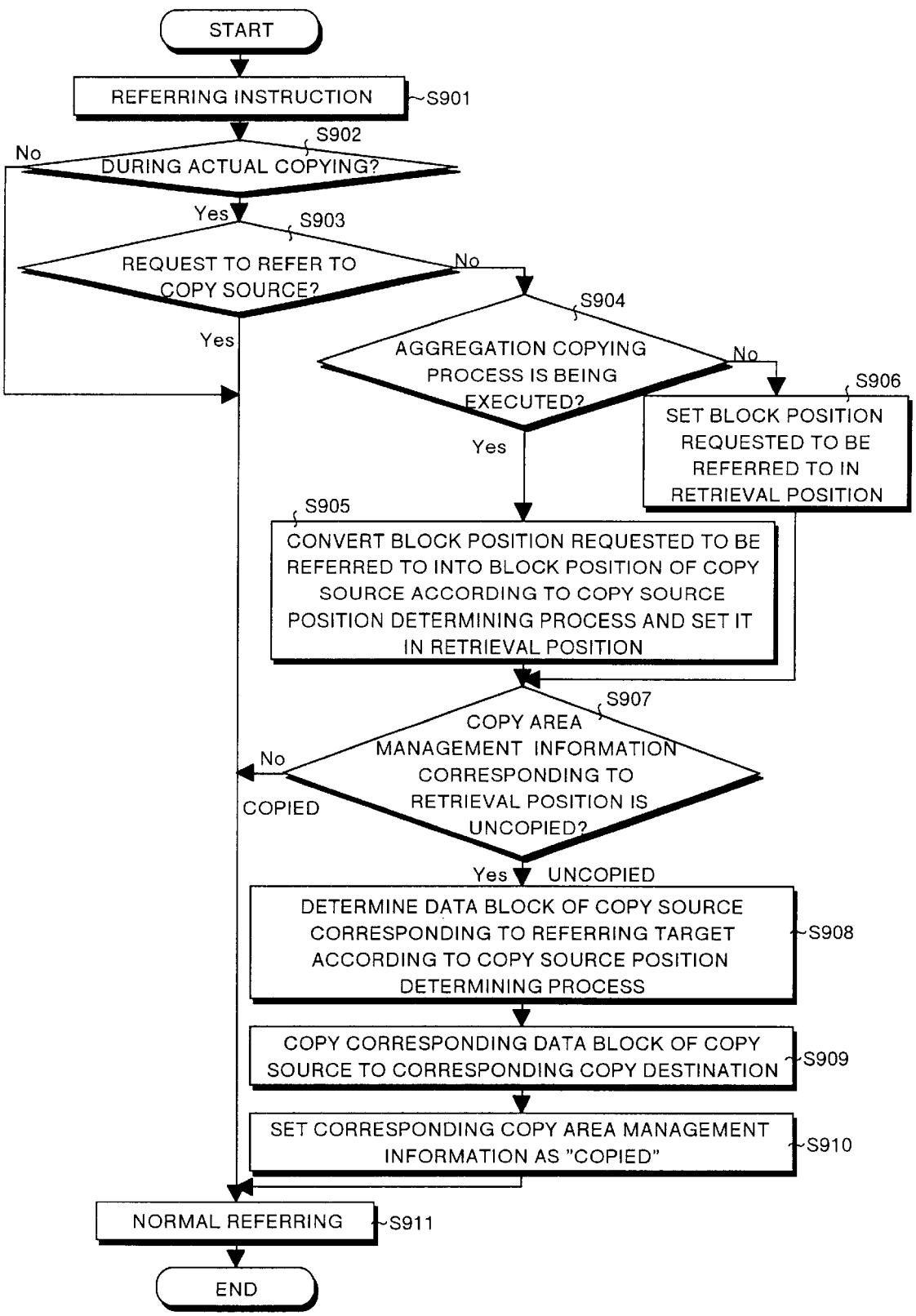
FIG. 9 is a flow chart showing a procedure of a referring process during copying.

There will be explained below the procedure of the referring process during copying. FIG. 9 is a flow chart showing the procedure of the referring process during copying. As shown in the drawing, when the access processing section 5 accepts a referring instruction (read) (step S901), it checks as to whether or not the actual copying is being executed (step S902).

When the actual copying is not being executed (NO at step S902), the access processing section 5 executes normal referring process (step S911), and when the actual copying is being executed (YES at step S902), the following process is executed.

More specifically, the access processing section 5 checks as to whether or not the copy source is requested to be referred to (step S903). When the copy source is requested to be referred to (YES at step S903), the normal referring process is executed (step S911). On the contrary, when the copy source is not requested to be referred to (NO at step S903), the access processing section 5 checks as to whether or not the aggregation copying process is being executed (step S904).

When the aggregation copying process is being executed (YES at step S904), the access processing section 5 converts a block position requested to be referred into a block position of the copy source so as to set it in a retrieval position (step S905). On the contrary, when the aggregation process is not being executed (NO at step S904), the access processing section 5 sets the block position requested to be referred to in the retrieval position (step S906).

Thereafter, the access processing section 5 check as to whether or not copy area management information corresponding to the retrieval position is uncopied (step S907). When the information is copied (NO at step S907), the access processing section 5 executes the normal referring process (step S911).

On the contrary, when the information is not copied (NO at step S907), the access processing section 5 determines a data block of the copy source corresponding to the referring target (step S908) according to the copy source position determining process, and copies the corresponding data block of the copy source to the corresponding copy destination (step S909). Thereafter, the access processing section 5 sets the corresponding copy area management information as "copied" (step S910), and executes the normal referring process (step S911).

In such a manner, during actual copying, the normal referring is executed at the time of the referring request of the copy source, and a judgment is made as to copied area or not at the time of the referring request of the copy destination. At the time of copied area, the normal referring process is executed. However, at the time of uncopied area, the corresponding area is actually copied and the normal referring process is executed. When the referring process is executed, even in the case of the copied or uncopied area, proper copied contents can be always referred to.

Figure 10:
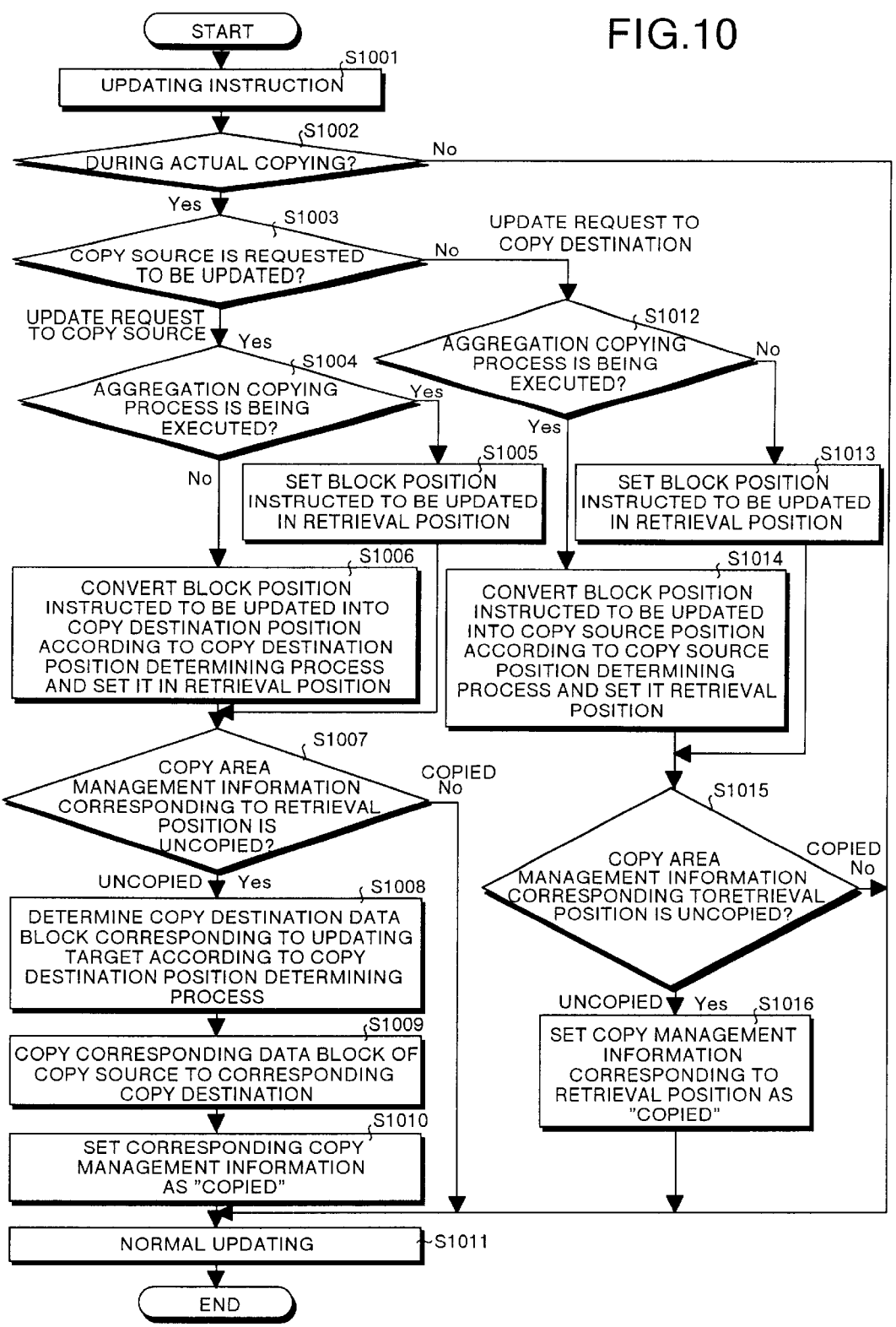
FIG. 10 is a flow chart showing a procedure of an update process during copying.

There will be explained below the procedure of the update process during copying. FIG. 10 is a flow chart showing the procedure of the update process during copying. As shown in the drawing, when the access processing section 5 checks an updating instruction (write) (step S1001), it checks as to whether or not the actual copying is being executed (step S1002). When the actual copying is not being executed (NO at step S1002), the normal update process is executed (step S1011).

On the contrary, when the actual copying is being executed (YES at step S1002), the access processing section 5 checks as to whether or not the copy source is requested to be updated (step S1003). When the copy source is requested to be updated (YES at step S1003), the access processing section 5 checks as to whether or not the aggregation copying process is being executed (step S1004).

As a result, when the aggregation copying process is being executed (YES at step S1004), the access processing section 5 sets a block position instructed to be updated in a retrieval position (step S1005). When the aggregation copying process is not being executed (NO at step S1004), the access processing section 5 converts the block position instructed to be updated into a copy destination position according to the copy destination position determining process so as to set it in the retrieval position (step S1006).

Thereafter, the access processing section 5 checks as to whether or not copy area management information corresponding to the retrieval position is uncopied (step S1007). When the information is copied (NO at step S1007), the normal update process is executed (step S1011). Meanwhile, when the information is uncopied (YES at step S1007), the access processing section 5 determines a data block of the copy destination corresponding to the updating target according to the copy destination position determining process (step S1008), and copies the data block of the copy source to the corresponding copy destination (step S1009). Further, the access processing section 5 sets the corresponding copy management information as "copied" (step S1010) and executes the normal update process (step S1011).

In addition, when the updating request is made not for the copy source but the copy destination at step S1003 (NO at step S1003), a check is made as to whether or not the aggregation copying process is being executed (step S1012). When the aggregation copying process is being executed (YES at step S1012), the block position instructed to be updated is converted into a copy source position and it is set in the retrieval position (step S1014) according to the copy source position determining process. When the aggregation copying process is not being executed (NO at step S1012), the block position instructed to be updated is set in the retrieval position (step S1013).

Thereafter, a check is made as to whether or not the copy area management information corresponding to the retrieval position is uncopied (step S1015). When the information is copied (NO at step S1015), the normal update process is executed (step S1011). On the contrary, when the information is uncopied (YES at step S1015), after the copy management information corresponding to the retrieval position is set as "copied" (step S1016), the normal update process is executed (step S1011).

As mentioned above, as for the updating request of the copy source during the actual copying, a judgment is made as to whether or not an area is copied, and when the area is copied, the normal updating is executed, and when the area is not copied, the area is actually copied and the normal updating is executed. The reason for this is because when uncopied copy source is updated, data of the copy destination are destroyed.

In addition, as for the updating request of the copy destination during the actual copying, a judgment is made as to whether or not an area is copied, and when the area is copied, the normal updating is executed, and when the area is not copied, the area is excluded from the copy nontarget and the normal updating is executed. The reason for this is because when a copy destination is updated after the copying instruction and the actual copying is executed, data of the copy destination are destroyed.

When a series of the update processes are executed, correct copied contents can be always updated regardless of copied or uncopied.

Figure 11:
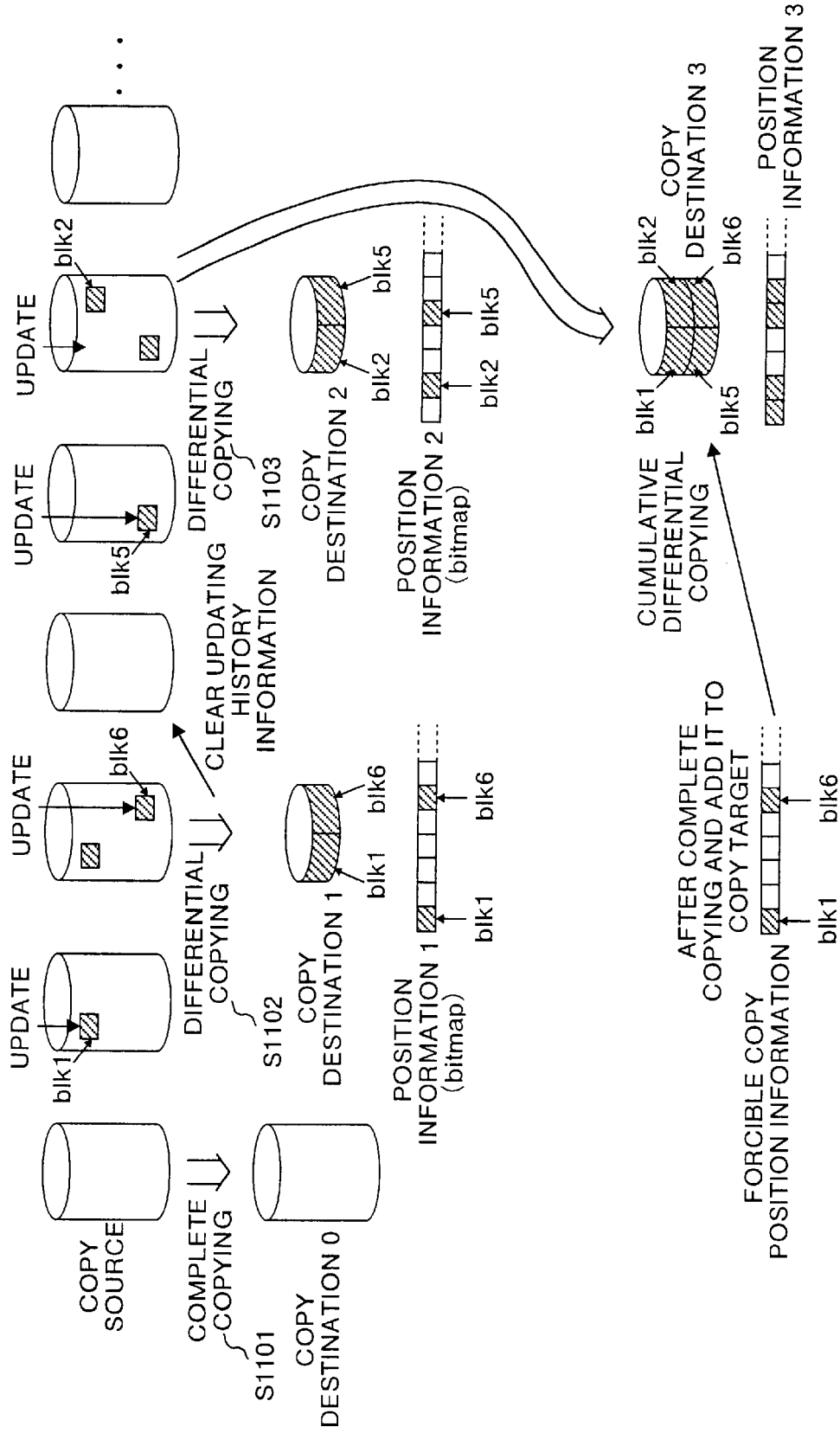
FIG. 11 is a differential backup operational example utilizing the aggregation copying process according to the present embodiment.

There will be explained below an operational example of differential backup utilizing the aggregation copying process according to the present embodiment. FIG. 11 is a diagram showing an operational example of the differential backup utilizing the aggregation copying process according to the present embodiment.

When the differential backup is executed, at first original is full backed up (step S1101). More concretely, the copy source logical disk is copied completely to the copy destination logical disk.

This copy can be realized in such a manner that the host 8 forcibly rewrites the update history information 7 so that all the blocks are updated, and the aggregation copying process is executed. Moreover, the copy can be realized also in such a manner that after the host 8 sets forcible copy position information so that all the blocks become forcibly copy targets, the aggregation copying process is executed.

When the aggregation copying process is instructed from the host 8, the host 8 can access to the copy source logical disk immediately. For this reason, time required for stopping the backup operation is minimized so that backup can be created quickly.

Thereafter, when the blocks 1 and 6 of the copy source logical disk are updated successively, differential copying is executed for the logical disk of the copy destination 1 (step S1102). This differential copying is executed by the aggregation copying process of the present embodiment.

More concretely, since the blocks 1 and 6 are updated here, only data blocks of the blocks 1 and 6 of the copy source logical disk are copied to the logical disk of the copy destination 1. Moreover, position information 1 shown in the drawing is posted as position information of the logical disk of the copy destination 1 to the host 8. The host 8 manages the position information 1 and the logical disk of the copy destination 1 so as to be capable of managing generations of backup of the copy destination logical disk.

Thereafter, when the blocks 5 and 2 are updated successively, differential copying is executed similarly for a copy destination 2 (step S1103). However, only data blocks of the blocks 2 and 5 of the copy source are copied to the logical disk of the copy destination 2. Moreover, position information 2 is posted as position information of the logical disk of the copy destination 2 to the host 8. The host 8 manages the position information 2 and the logical disk of the copy destination 2 so as to be capable of managing generations of backup of the copy destination logical disk.

In such a manner, at first full backup copies are created and differential data are backed up successively by using the aggregation copying process so that the backup of the logical disk can be retained. However, in another method, cumulative difference can be backed up in the logical disk.

This cumulative difference is suitable for the case where data copied to a logical disk are further stored in a tape or the like. For example, when full backup and corresponding difference are retained in different tapes, tapes whose number is proportional to a number of generations are required at the time of restoring. As a result, a risk of tapes being lost becomes higher, and time required for restoring becomes longer. On the contrary, the cumulative difference has an advantage that restoring can be executed by using only two tapes for full backup and for storing cumulative differences of the respective generations.

Particularly since a disk is easily affected by physical impulsion such as earthquake, and has bad portability, if backup is created only in a disk, a risk of data being lost becomes high when an accident occurs. For this reason, it is desirable that important data should be backed up by using cumulative difference in a state that both disk and tapes are used.

Figure 12:
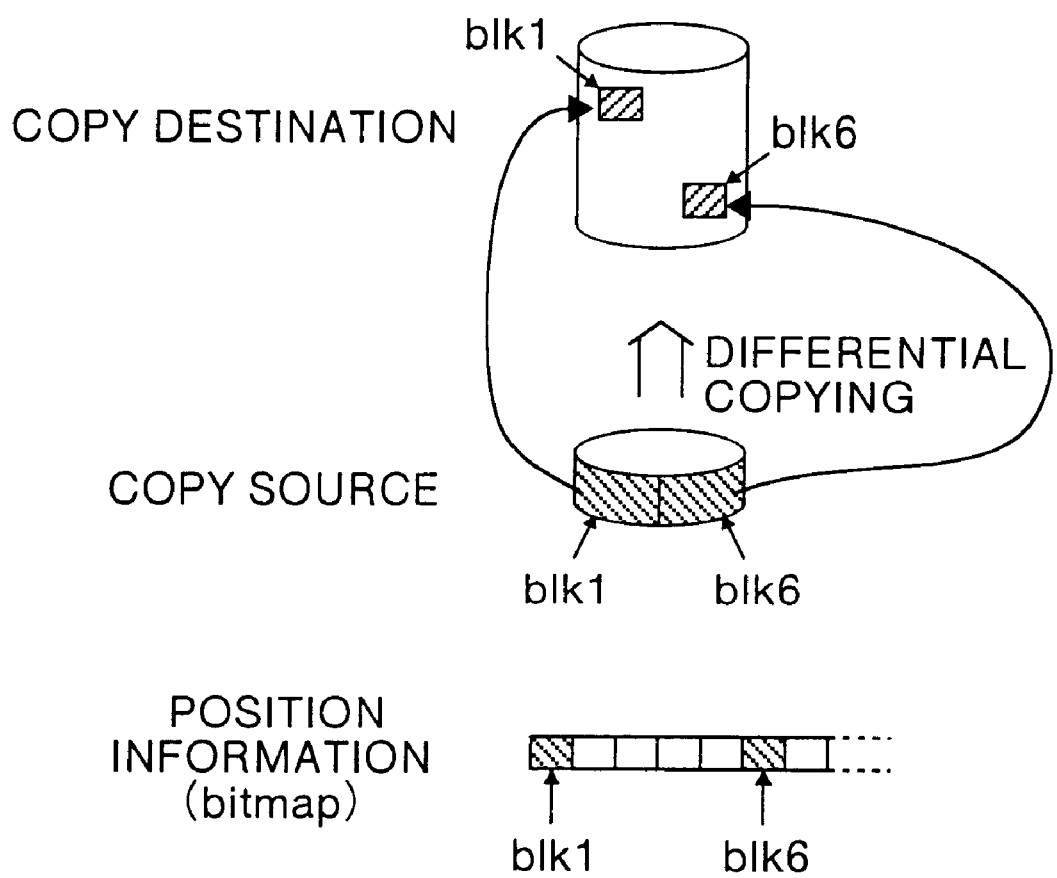
FIG. 12 is an explanatory diagram for explaining a restoring operational example utilizing the diffusion copying process according to the present embodiment.

There will be explained below a restoring operational example utilizing the diffusion copying process according to the present embodiment. FIG. 12 is an explanatory diagram for explaining the restoring operational example utilizing the diffusion copying process according to the present embodiment. Here shows restoring when differences are backed up as shown in FIG. 11.

As shown in FIG. 12, differential data are applied to a logical disk 0 of full backup and the diffusion copying process can be used when the data are reconstructed.

More concretely, copy destination 1 is the copy source logical disk, and copy destination 0 is the copy destination logical disk, and the diffusion copying process is executed based on position information so that differential data can reflect contents of the full backup. As mentioned above, the diffusion copying process of the present embodiment is effective when backup data are restored.

In addition, in this diffusion copying process, when the copying instruction is given from the host 8, the host 8 can access to a restoring destination logical disk immediately, and data can be operated quickly from the backup stored in the differential format.

Further, a plurality of differential data are copied simultaneously so that even when a number of generations is not less than 1 and differences of the plurality of generations should be applied, data can be restored quickly. As a result, it is not necessary to retain backup in a disk in the cumulative difference format so that data can be restored with efficiency of normal difference.

FIG. 13 is an explanatory diagram for explaining the restoring operation when the generation 1 is full backup and the generations 2 and 3 are differentially backed up. As shown in the drawing, since the host 8 prevents the same blocks of the copy destination from being changed by a plurality of copy sources, the host 8 searches respective position information managed by itself for overlapped position information. When blocks are overlapped, the host 8 sets forcible non-copy position information so that data blocks other than the data block whose generation is the closest to the generation to be restored are excluded from the copy target. Thereafter, the host 8 successively issues the diffusion copying process request.

In such a manner, the respective data of the generations 1, 2 and 3 and only necessary data blocks are diffusely copied to the same copy destination simultaneously. As a result, data of arbitrary generation managed by the host 8 can be restored quickly to arbitrary logical disk.

As mentioned above, conventionally a n-times sized logical disk has been required for retaining data of n generations in a logical disk. However, according to the present embodiment, only difference updated due to the copying at previous time can be copied immediately in appearance. For this reason, data of n generations in the logical disk can be retained with 1+α size (size of differential data) so that space efficiency is improved. Particularly in the typical operational environment, since a size of updating from previous backup is an order of a several %, the space efficiency is improved remarkably.

In addition, in the prior art, copying between logical disks can be completed immediately, but when data copied to a logical disk are further copied to another medium in order to heighten integrity of the data, the copying time is required in proportion to the size of the copy source logical disk. However, according to the present embodiment, since only updated data can be copied to another medium, the copying time to another medium can be shortened greatly.

For example, since performance of current high-speed tape is about a dozen MB/s, even when data of 50 GB are retained, it takes about 1 hour. On the contrary, according to the present embodiment, if only differential data are retained, the time can be shortened to an order of a several minute.

In addition, according to the present embodiment, not only differential data from the time point of previous copying but also differences (cumulative difference) from the time point of arbitrary copying can be completely copied immediately. For this reason, a flexible operation can be performed.

For example, when full backup and corresponding difference are retained in different tapes, tapes whose number is proportional to a number of generations are required at the time of recovering data. However, if cumulative difference is retained, a number of tapes can be reduced, and time required for recovering data and a risk of tapes being lost can be reduced.

In addition, in the present embodiment, data of the plurality of generations in a logical disk are maintained in a full+differential format, and physical copy is created. For this reason, even when hard abnormality occurs in a copy source logical disk, a copy destination logical disk can be accessed securely. Namely, while the space efficiency is improved, data can be maintained sufficiently.

For example, in a conventional log structured system, unchanged disk block is used commonly in a copy source and a copy destination so that high space efficiency can be achieved. However, since in this technique, a disk block is used commonly in the copy source and the copy destination, if physical hard abnormality occurs in the common block, a copy destination logical disk is also inaccessible. For this reason, according to the present embodiment, it is found that the data integrity is improved sufficiently.

In addition, in the present embodiment, data, which are stored continuously in a copy source logical disk 2 in a differential format, can be copied immediately to an original position of a copy destination logical disk 1. For this reason, not only backup but also restoring can be executed quickly. Namely, restoring when differential backup is created can be executed quickly.

In addition, in the present embodiment, the host 8 manages differential information, and copying to overlapped block can be restricted. For this reason, the copying process can be executed from a plurality of copy sources to one copy destination logical disk simultaneously. For this reason, data of arbitrary generation in full format can be created quickly from data compressed in differential format. Therefore, there does not arise a problem that when differential backups of the plurality of generations are created, respective generations should be applied successively.

As explained above, according to the present invention, differential data, which are stored in a plurality of areas existing discretely on a copy source logical disk, are aggregately copied to continuous area on a copy destination logical disk. When the request to access to the copy source logical disk or the copy destination logical disk is generated during the aggregation copying process, the aggregation copying process is stopped so that the accessing process is executed. For this reason, the inter-logical disk copy processing apparatus, which is capable of retaining a plurality of generation in the logical disk efficiently and of copying and retaining data quickly to another external medium, can be obtained.

In addition, a plurality of areas on a copy source logical disk to be copy target are selected based on update history information showing update history of the copy source logical disk and forcible copy position information which was instructed to be forcibly copied from an outer apparatus. For this reason, the inter-logical disk copy processing apparatus, which is capable of setting the areas specified externally as copy targets, can be obtained.

In addition, logical OR of the update history information in which area positions of a copy source logical disk have one to one correspondence to bit positions and the forcible copy position information is calculated so that copy target information is created. Areas to be copied are managed based on the created copy target information. For this reason, the inter-logical disk copy processing apparatus which is capable of managing areas to be copied efficiently can be obtained.

In addition, differential data which were aggregately copied to continuous area on a copy destination logical disk are diffusely copied in an original position of the copy source logical disk. For this reason, the inter-logical disk copy processing apparatus, which is capable of restoring the differential data, which were saved on the copy destination logical disk, in the copy source logical disk efficiently can be obtained.

In addition, copy areas to be copy targets are determined based on position information of a copy source logical disk and forcible non-copy position information showing areas excluded from copy targets instructed from an external apparatus. For this reason, the inter-logical disk copy processing apparatus which is capable of excluding a part of differential data to be restored can be obtained.

In addition, when a copy uncompleted area of a copy destination logical disk is accessed to be updated, the access target area of the copy destination logical disk is updated. For this reason, the inter-logical disk copy processing apparatus, which is capable of accessing to the copy destination logical disk even if copying is not completed, can be obtained.

In addition, updating access to a copy destination logical disk is forbidden during the aggregation copying process. For this reason, the inter-logical disk copy processing apparatus, which is capable of executing the aggregation copying process quickly, can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An inter-disk copy processing apparatus for copying data stored in a plurality of areas on a copy source disk to a copy destination disk, the apparatus comprising a controller including:

an aggregation copying unit which aggregately copies differential data stored in a plurality of areas discretely existing on said copy source disk to a continuous area on said copy destination disk;

an access processing unit which, when a request to access to said copy source disk or copy destination disk is generated during the aggregation copying process by said aggregation copying unit, stopping the aggregation copying process by said aggregation copying unit and executing an accessing process; and wherein said controller is able to perform a diffusion copying process for diffusely copying the differential data, which were aggregately copied to the continuous area on said copy destination disk, to original positions of said copy source disk.

2. The inter-disk copy processing apparatus according to claim 1, wherein said aggregation copying unit selects a plurality of areas on said copy source disk to be copy target based on update history information showing updating histories of said copy source disk and forcible copy position information showing that forcible copying is instructed from an external apparatus.

3. The inter-disk copy processing apparatus according to claim 2, wherein said aggregation copying unit calculates logical OR of the update history information in which the area positions of said copy source disk have one to one correspondence to bit positions and forcible copy position information so as to create copy target information, and manages areas to be copied based on the created copy target information.

4. The inter-disk copy processing apparatus according to claim 1, wherein said diffusion copying process determines copy areas to be copy targets based on position information of said copy source disk and forcible non-copy position information showing areas to be excluded from the copy targets instructed from an external apparatus.

5. The inter-disk copy processing apparatus according to claim 1, wherein said access processing unit updates an access target area of said copy destination disk when copy non-complete areas of said copy destination disk are accessed to be updated.

6. The inter-disk copy processing apparatus according to claim 1, wherein said access processing unit forbids updating access to said copy destination disk during the aggregation copying process by said aggregation copying unit.

7. An inter-disk copy processing method of using a controller for copying data stored in a plurality of areas on a copy source disk to a copy destination disk or vice versa, the method comprising the steps of:

selectively carrying out one of the steps of aggregately copying differential data and diffusely copying the differential data;

when aggregately copying is carried out, copying differential data stored in a plurality of areas discretely existing on said copy source disk to a continuous area aggregately on said copy destination disk;

when a request to access to said copy source disk or copy destination disk is generated during the aggregation copying process in the aggregation copying step, stopping the aggregation copying process and executing an accessing process;

when diffusely copying is carried out, copying the differential data, which were aggregately copied to the continuous area on said copy destination disk, diffusely to original positions of said copy source disk; and when the request to access to said copy source disk or copy destination disk is generated during the diffusely copying process in the diffusely copying step, stopping the diffusely copying process and executing the accessing process.

8. A computer-readable recording medium which stores a computer program containing instructions which when executed on a computer allows copying of data stored in a plurality of areas on a copy source disk to a copy destination disk or vice versa, the computer program using a controller for executing the steps of:

selectively carrying out one of the steps of aggregately copying differential data and diffusely copying the differential data;

when aggregately copying is carried out, copying differential data stored in a plurality of areas discretely existing on said copy source disk to a continuous area aggregately on said copy destination disk;

when a request to access to said copy source disk or copy destination disk is generated during the aggregation copying process in the aggregation copying step, stopping the aggregation copying process and executing an accessing process;

when diffusely copying is carried out, copying the differential data, which were aggregately copied to the continuous area on said copy destination disk, diffusely to original positions of said copy source disk; and when the request to access to said copy source disk or copy destination disk is generated during the diffusely copying process in the diffusely copying step, stopping the diffusely copying process and executing the accessing process.

* * * * *